No. 714,087. Patented Nov. 18, 1902.
E. D. WOODS.
SHEARS.
(Application filed Mar. 10, 1902.)
(No Model.)
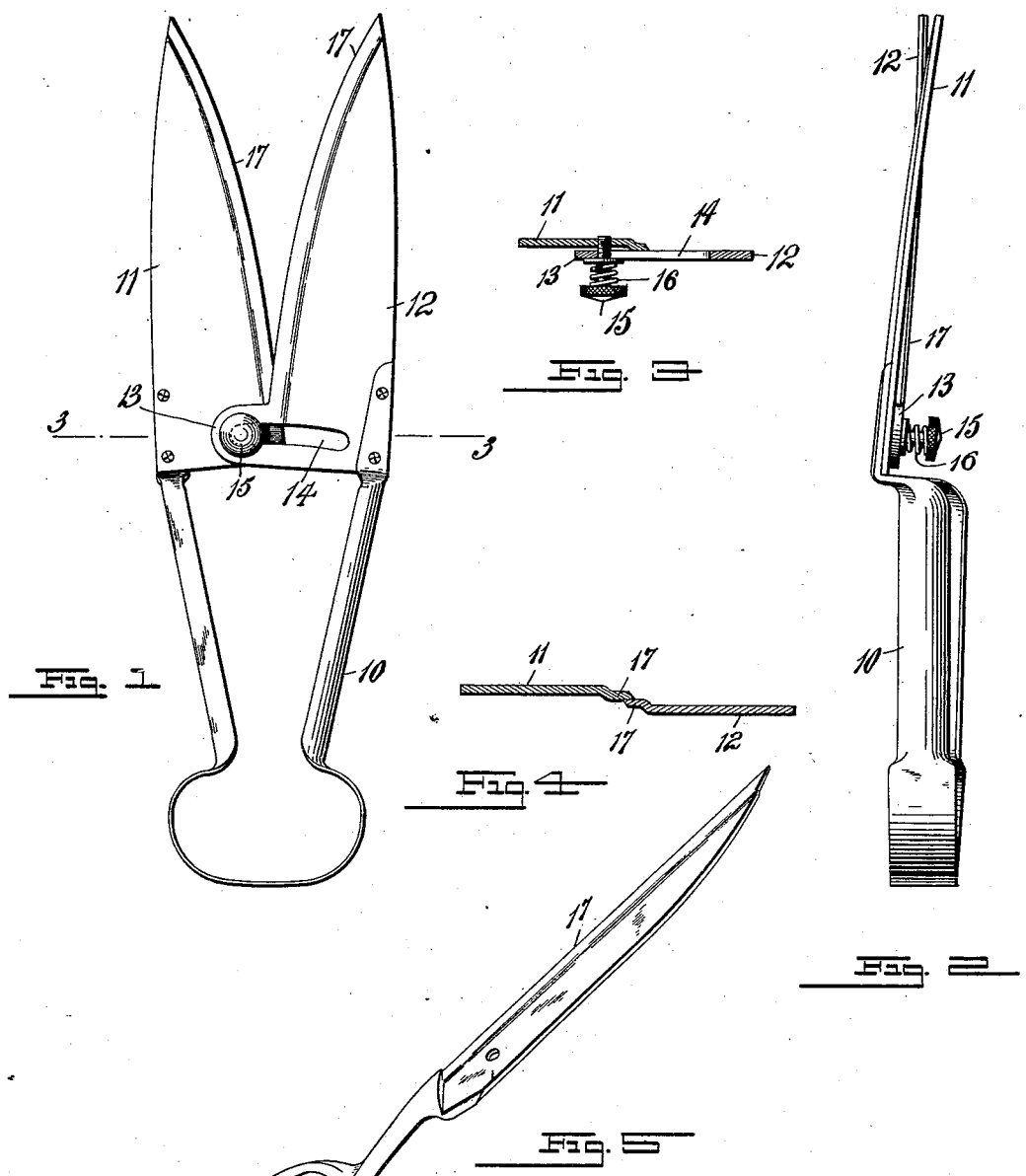
WITNESSES:
INVENTOR
Edward D. Woods.
BY
Wm H Canfield Jr. ATTORNEY.

UNITED STATES PATENT OFFICE.

EDWARD D. WOODS, OF NEWARK, NEW JERSEY.

SHEARS.

SPECIFICATION forming part of Letters Patent No. 714,087, dated November 18, 1902.

Application filed March 10, 1902. Serial No. 97,413. (No model.)

*To all whom it may concern:*

Be it known that I, EDWARD D. WOODS, a citizen of the United States, residing at Newark, in the county of Essex and State of New Jersey, have invented certain new and useful Improvements in Shears; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

The present device is designed to furnish a cheaper and at the same time better shears than heretofore made.

In all shears as made previously the sides of the blades in contact with one another or on the "inside" have been hollow ground in order to reduce the friction on the blades and to provide the clearance necessary in the shears after the cutting edges have passed one another. This hollow grinding is expensive and consumes considerable time in the manufacture of the shears, and to obviate this difficulty I have devised this construction.

I illustrate in Figure 1 the style of shears known as "grass-shears," and in Fig. 2 I show an end view of Fig. 1. Fig. 3 is a section on line 3 3, and Fig. 4 depicts two of my new-style blades in cutting relation. Fig. 5 illustrates the blade of a pair of scissors made according to my idea of the tool.

In the grass-shears that I show I also desire to protect the locking and holding device shown, that prevents undue spreading of the blades when heavy material is engaged and takes the strain off the hand when cutting.

In the views, 10 is the ordinary integral spring-handle, to the ends of which are fastened two blades 11 and 12, the blade 12 having a tongue 13, and through this tongue and the blade 12 a slot 14 is cut. A screw 15 passes through the slot and enters and passes through the blade 11 and being surrounded by a spring 16, that presses on the tongue 13 and the head of the screw, causes the blades to be held in cutting engagement, still allowing enough give to make the operation easy. This is necessary, as the blades are slightly forced apart at the bottom when cutting is being done near the points; but when the shears are forced close together and the screw turned up tight, compressing the spring, the blades are held in that position and can be placed away in a smaller space and less liable to accidentally cut.

Each blade on the side adjacent to the other is provided on the cutting edge with a raised strip 17, being stamped or swaged, that bear against each other and also provide a clearance beyond them that does not necessitate any hollow grinding. I may provide the blades of a pair of scissors, as shown in Fig. 5, with this edge, and the action, of course, is the same. The advantages of this construction are evident, and the shears has a smoother easier action without undue friction.

Having thus described my invention, what I claim is—

1. A pair of shears, the blades having on the cutting edge a strip, swaged to project toward one another on the adjacent edges, substantially as set forth.

2. A pair of shears, the blades having on the cutting edge a swaged strip, the strip on each blade projecting toward the other, and forming a clearance between the blades when the cutting edges have passed, substantially as set forth.

3. A pair of shears, consisting of a spring-handle, a pair of blades, one of the blades having a slot, a set-screw projecting through the slot and screwed into the other blade each blade having a swaged strip on the cutting edge, extending toward and bearing against one another, substantially as described.

4. A pair of shears, comprising a spring-handle, means on the blades to allow of a laterally-yielding movement of the blades toward each other, each blade having a swaged strip on the cutting edge extending toward and bearing against one another, substantially as described.

In testimony that I claim the invention set forth above I have hereunto set my hand this 6th day of March, 1902.

EDWARD D. WOODS.

Witnesses:
WM. H. CAMFIELD, Jr.,
LOUISE C. MÜLLER.